(12) United States Patent
Li (10) Patent No.: US 9,304,903 B2
(45) Date of Patent: Apr. 5, 2016

(54) BLOCK GROUPING METHOD FOR SOLID STATE DRIVE

(71) Applicant: LITE-ON TECHNOLOGY CORPORATION, Taipei (TW)

(72) Inventor: Chia-Lun Li, Hsinchu (TW)

(73) Assignee: LITE-ON TECHNOLOGY CORPORATION, Taipei (TW)

( * ) Notice: Subject to any disclaimer, the term of this patent is extended or adjusted under 35 U.S.C. 154(b) by 228 days.

(21) Appl. No.: 14/022,361

(22) Filed: Sep. 10, 2013

(65) Prior Publication Data

US 2015/0026389 A1  Jan. 22, 2015

(30) Foreign Application Priority Data

Jul. 17, 2013 (CN) .......................... 2013 1 0300535

(51) Int. Cl.
*G06F 12/00* (2006.01)
*G06F 12/02* (2006.01)

(52) U.S. Cl.
CPC ................................. *G06F 12/0246* (2013.01)

(58) Field of Classification Search
None
See application file for complete search history.

(56) References Cited

U.S. PATENT DOCUMENTS

| 2010/0174845 | A1* | 7/2010 | Gorobets et al. | 711/103 |
| 2012/0066438 | A1* | 3/2012 | Yoon et al. | 711/103 |
| 2012/0239851 | A1* | 9/2012 | Calvert et al. | 711/103 |
| 2014/0215133 | A1* | 7/2014 | Seo et al. | 711/103 |

* cited by examiner

*Primary Examiner* — Daniel Tsui
(74) *Attorney, Agent, or Firm* — WPAT, PC; Justin King (57) ABSTRACT

A block grouping method for a solid state drive includes the following steps. Firstly, plural blocks are classified into a high valid data count group and a low valid data count group according to valid data counts of respective blocks. An average erase count is set according to a specified number of blocks of the low valid data count group. A first block is selected from the high valid data count. A difference between the average erase count and a first erase count of the first block is calculated. If the difference exceeds a threshold value, a wear leveling operation is performed on the first block.

13 Claims, 6 Drawing Sheets

BLOCK GROUPING METHOD FOR SOLID STATE DRIVE

This application claims the benefit of People's Republic of China Application Serial No. 201310300535.6, filed Jul. 17, 2013, the subject matter of which is incorporated herein by reference.

FIELD OF THE INVENTION

The present invention relates to a control method for a solid state drive, and more particularly to a block grouping method for a solid state drive.

BACKGROUND OF THE INVENTION

As is well known, a solid state drive (SSD) is a data storage device that uses a NAND-based flash memory to store data. The NAND-based flash memory is a non-volatile memory. After data are written to the flash memory, if no power is supplied to the solid state drive, the data are still retained in the solid state drive.

Figure 1:
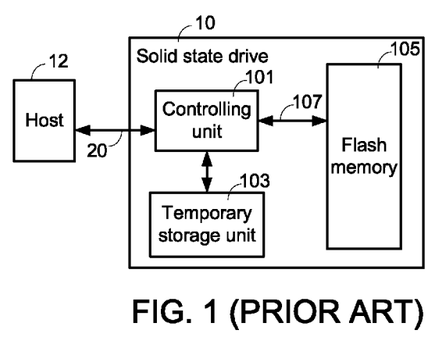
FIG. 1 (prior art) is a schematic functional block diagram illustrating a conventional solid state drive.

FIG. 1 is a schematic functional block diagram illustrating a conventional solid state drive. As shown in FIG. 1, the solid state drive 10 comprises a controlling unit 101, a temporary storage unit 103, and a flash memory 105. The flash memory 105 is accessible by the controlling unit 101 through an internal bus 107. In addition, the controlling unit 101 is in communication with a host 12 through an external bus 20. Consequently, commands and data can be exchanged between the controlling unit 101 and the host 12. The temporary storage unit 103 is a random access memory for temporarily storing the read date, the write data or the temporary parameter which is required for the controlling unit 101. Moreover, the external bus 20 is a USB bus, an IEEE 1394 bus, an SATA bus, or the like.

Generally, the flash memory 105 comprises plural blocks. Each block comprises plural pages, for example 64 pages. Each page is typically 4K bytes in size. Due to the inherent properties of the flash memory 105, at least one page is written at a time during the writing operation, but a block is erased during the erasing operation.

Generally, each block of the flash memory 105 has limited erase count. If some specified blocks have high erase counts, these blocks are overused and possibly become bad blocks. Under this circumstance, the life span of the flash memory 105 may be reduced. For solving the above drawbacks, a wear leveling technique is disclosed. According to the wear leveling technique, all blocks of the flash memory 105 are averagely used. Consequently, the possibility of causing overuse of specified blocks (i.e. the high erase-count blocks) and generating bad blocks will be reduced. In other words, the used of the wear leveling technique may prolong the life span of the flash memory 105.

The erase counts of all blocks of the flash memory 105 are usually recorded in the solid state drive 10. For performing the wear leveling operation, the conventional solid state drive 10 may judge whether the data in all blocks are hot data (frequently-refreshed data) or cold data (seldom-refreshed data) according to the erase counts of respective blocks. Generally, if the block is frequently erased, the data in the block are frequently refreshed and may be considered as the hot data. Whereas, if the block is seldom erased, the data in the block are seldom refreshed and may be considered as a cold data.

For performing the wear leveling operation, the erase counts of all blocks of the flash memory 105 are firstly detected by the controlling unit 101 of the solid state drive 10. Then, the cold data in the low erase-count block are transferred to the high erase-count block. Then, the low erase-count block is erased as a free block, and thus the storing space of the low erase-count block is released. Then, data are stored into the free block again by the controlling unit 101 during the normal operation. In other words, after the wear leveling operation is performed, the storing space of the low erase-count block is released. By repeatedly using the low erase-count blocks, the erase counts of all blocks of the flash memory 105 are closer to each other. Consequently, all blocks of the flash memory 105 can be averagely used.

However, after the flash memory 105 has been accessed for a long time, almost each block of the flash memory 105 contains some valid data and some invalid data. If the block contains the valid data, the block fails to be erased as the free block. Since the space of the flash memory 105 is occupied by a great number of invalid data, the writable space of the flash memory 105 will gradually reduce. For solving this problem, it is necessary to perform a garbage collection.

Figure 2:
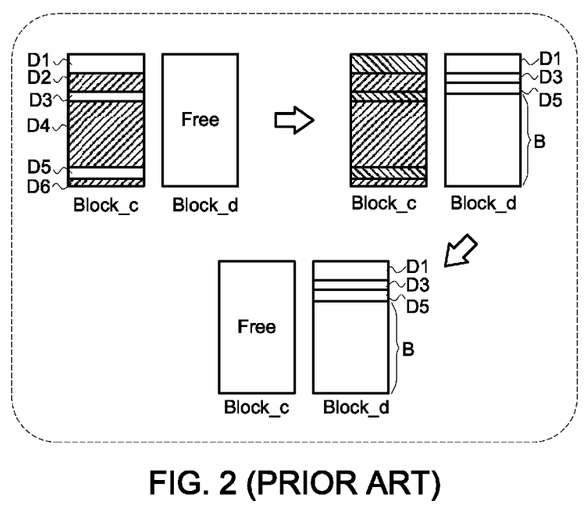
FIG. 2 (prior art) schematically illustrates a conventional process of performing a garbage collection.

FIG. 2 schematically illustrates a conventional process of performing a garbage collection. As shown in FIG. 2, the data D2, D4 and D6 in the block c (Block_c) are invalid data, which are indicated by oblique lines, and the data D1, D3 and D5 in the block c (Block_c) are valid data. In addition, the block d (Block_d) is a free block. While the garbage collection is performed on the block c (Block_c) by the controlling unit 101, the valid data D1, D3 and D5 in the block c (Block_c) are firstly moved to the free block d (Block_d), and all data in the block c (Block_c) are set as invalid data. After the invalid data in the block c (Block_c) are erased, the block c (Block_c) is erased as a new free block. In other words, after the garbage collection is performed, the block c (Block_c) becomes a new free block. Moreover, the block d (Block_d) still has a free space B for storing data.

Generally, before the garbage collection is performed by the solid state drive 10, the controlling unit 101 may determine whether the blocks have to be subject to the garbage collection according to the valid data counts (VAC) of respective blocks. In other words, while the controlling unit 101 starts the garbage collection, the controlling unit 101 should search the number of valid data in all blocks sequentially, and select the blocks with lower valid data counts to be subject to the garbage collection.

In the conventional solid state drive, the garbage collection and the wear leveling operation are independent from each other. For performing the wear leveling operation, the erase counts of the blocks are taken into consideration, and the data in the low erase-count block are transferred to the high erase-count block, so that the erase counts of the blocks are balanced. For performing the garbage collection, the valid data counts of the blocks are taken into consideration, and the data in the block with low valid data count are moved to a free block and then the data in the original block is erased as a new free block, so that the storing space for storing data is released.

However, while the garbage collection or the wear leveling operation is performed, the performance of the solid state drive is largely reduced. Therefore, there is a need of providing a control method for controlling a garbage collection and a wear leveling operation of a solid state drive without obviously reducing the performance of the solid state drive.

SUMMARY OF THE INVENTION

An embodiment of the present invention provides a block grouping method for a solid state drive. The block grouping method includes the following steps. Firstly, plural blocks are classified into a high valid data count group and a low valid data count group according to valid data counts of respective blocks, and a link list is established according to erase counts of respective blocks. An average erase count is set according to the blocks of the low valid data count group. Then, it is judged whether a host refreshes a stored data of a flash memory of the solid state drive or adds a new data into the flash memory. If the judging condition is satisfied, the valid data count of the block corresponding to the refreshed data or the new data is changed. If a garbage collection is not started by the solid state drive, the above judging step is repeatedly done. If the garbage collection is started by the solid state drive, select the block with an erase content lower than the average erase count from the low valid data count group, perform the garbage collection on the selected block, update the average erase count according to the blocks of the low valid data count group, and determine whether a wear leveling operation is started according to the updated average erase count.

Another embodiment of the present invention provides a block grouping method for a solid state drive. The block grouping method includes the following steps. Firstly, plural blocks are classified into a high valid data count group and a low valid data count group according to valid data counts of respective blocks. An average erase count is set according to a specified number of blocks of the low valid data count group. A first block is selected from the high valid data count. A difference between the average erase count and a first erase count of the first block is calculated. If the difference exceeds a threshold value, a wear leveling operation is performed on the first block.

Another embodiment of the present invention provides a block grouping method for a solid state drive. The block grouping method includes the following steps. Firstly, plural blocks are classified into a high valid data count group and a low valid data count group according to valid data counts of respective blocks, and a link list is established according to erase counts of respective blocks. An average erase count is set according to a specified number of blocks of the low valid data count group. If a garbage collection is started by the solid state drive, the block with a lower erase content is selected from the low valid data count group according to the link list, and the garbage collection is performed on the selected block. If a difference between the average erase count and a first erase count of a specified block of the high valid data count group exceeds a threshold value, a wear leveling operation is performed on the first block.

Numerous objects, features and advantages of the present invention will be readily apparent upon a reading of the following detailed description of embodiments of the present invention when taken in conjunction with the accompanying drawings. However, the drawings employed herein are for the purpose of descriptions and should not be regarded as limiting.

BRIEF DESCRIPTION OF THE DRAWINGS

The above objects and advantages of the present invention will become more readily apparent to those ordinarily skilled in the art after reviewing the following detailed description and accompanying drawings, in which.

DETAILED DESCRIPTION OF PREFERRED EMBODIMENTS

The present invention provides a block grouping method for classifying all blocks into several groups according to the valid data counts of respective blocks. Moreover, for performing a garbage collection, the blocks to be subject to the garbage collection are determined according to the erase counts of respective blocks. Consequently, while the garbage collection is performed, the function of balancing the erase counts of all blocks is achievable. The block grouping method of the present invention may be applied to the solid state drive 10 with the architecture as shown in FIG. 1. It is noted that the applications of the block grouping method of the present invention are not restricted to the solid state drive of FIG. 1.

In accordance with a feature of the present invention, when the solid state drive 10 is powered on and an initialization procedure is performed, the controlling unit 101 may firstly establish a link list in the temporary storage unit 103 according to the valid data counts of all blocks. In the link list, all blocks are classified into several groups according to the valid data counts of respective blocks.

After the initialization procedure is completed and the data of the solid state drive 10 can be normally accessed by the host 12, the controlling unit 101 will store the refreshed data provided by the host 12 into blank pages. Under this circumstance, the old data corresponding to the refreshed data will be considered as invalid data, and the valid data count of the block containing the old data will be changed. Moreover, in case that the valid data count of the block is changed, the link list in the temporary storage unit 103 is also updated by the controlling unit 101.

FIGS. 3A~3D schematically illustrate a block grouping method for classifying blocks into two groups according to an embodiment of the present invention. During the initialization procedure of the solid state drive 10, all blocks are classified into a low VAC group and a high VAC group according to the valid data counts (VAC) of respective blocks. In this embodiment, the blocks with respective valid data counts higher than 80% of the maximum valid data count are classified into the high VAC group, and the other blocks are classified into the low VAC group. It is noted that the above definitions of classifying the blocks with respective valid data counts higher than 80% of the maximum valid data count into the high VAC group are presented herein for purpose of illustration and description only. However, those skilled in the art will readily observe that the definitions of the high VAC group and the low VAC group may be altered according to the practical requirements.

Figure 3A:
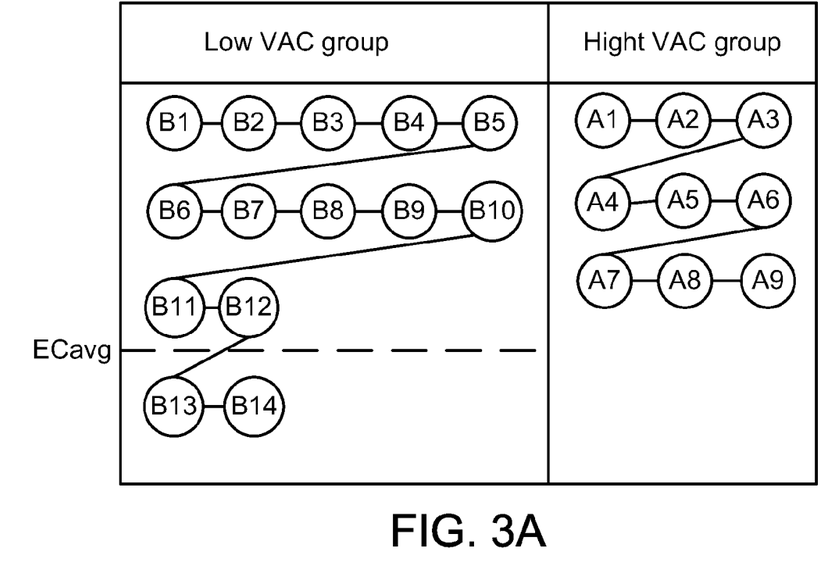
FIGS. 3A~3D schematically illustrate a block grouping method for classifying blocks into two groups according to an embodiment of the present invention.

After all blocks are classified into the two groups, as shown in FIG. 3A, the high VAC group comprises nine blocks A1~A9; and the low VAC group comprises fourteen blocks B1~B14. Moreover, the blocks of each group may be arranged in a link according to the erase counts of respective blocks. For example, the first block of each link has the highest erase count, and the last block of each link has the lowest erase count. As shown in FIG. 3A, the block with the lowest erase count in the high VAC group is the block A9, and the block with the lowest erase count in the low VAC group is the block B14.

In this embodiment, an average erase count ECavg is set in the low VAC group. The average erase count ECavg is determined according to the link of the low VAC group. For example, in an embodiment, the average erase count ECavg is an average of the erase counts of the last M blocks in the link of the low VAC group. If M=5, the average erase count ECavg is the average of the erase counts of the last five blocks B10~B14. As shown in FIG. 3A, the erase counts of the blocks B13 and B14 are lower than the average erase count ECavg. By the way, if the average of the erase counts of all blocks in the link is used as the average erase count ECavg, the standard deviation will be very large. Since the average of the erase counts of the last M blocks in the link is used as the average erase count ECavg according to the present invention, the standard deviation will be largely reduced.

After the link list of the solid state drive 10 is established by the controlling unit 101 and stored in the temporary storage unit 103, the data in the flash memory 105 can be normally accessed by the host 12.

As the number of write commands transmitted from the host 12 increases, the valid data count of each block correspondingly changes. For example, if the write data is a new data, the valid data count of the written block increases. Whereas, if the write data is a refreshed data, the valid data count of the written block increases. Moreover, since the old data corresponding to the refreshed data is considered as the invalid data, the valid data count of the block storing the old data decreases. Of course, the host 12 may transmit a delete command to the solid state drive 10. In response to the delete command, the valid data count of the specified block storing associated data will decrease.

Moreover, according to the command from the host 10 and the data modification of the flash memory 105, the link list in the temporary storage unit 103 may be updated by the controlling unit 101. In case that the valid data count of a specified block is changed, the controlling unit 101 will judge whether the specified block is classified into another group according to the changed valid data count. In case that the erase count of a specified block is changed, the controlling unit 101 will re-sort the blocks of the corresponding group according to the changed erase count. After many times of accessing operations by the host 12, if the solid state drive 10 is ready to perform the garbage collection, the block to be subject to the garbage collection is quickly selected by the controlling unit 101 according to the contents of the updated link list in the temporary storage unit 103.

Figure 3B:
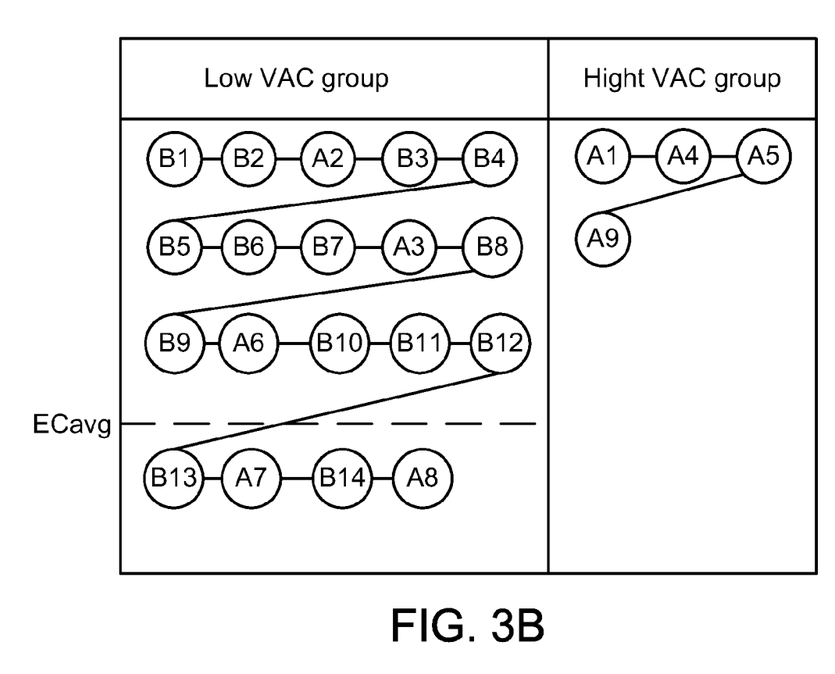

For example, after many times of accessing operations, the contents of the link list in the temporary storage unit 103 is shown in FIG. 3B. When the solid state drive 10 is ready to perform the garbage collection, the blocks with the lower erase counts in the low VAC group are directly selected by the controlling unit 101 in order to be subject to the garbage collection. For example, the three blocks A7, B14 and A8 with the lower erase counts are selected to be subject to the garbage collection. After the garbage collection is completed, the three lower erase-count blocks A7, B14 and A8 are erased as free blocks, and free spaces are released for allowing the controlling unit 101 to store data again.

Obviously, according to the block grouping method of the present invention, after the garbage collection is performed by the solid state drive 10, the blocks with lower erase counts are released, and the blocks with lower erase counts can be erased and written again. Consequently, while the garbage collection is performed by the solid state drive 10, the efficacy of using the wear leveling operation to release the low erase-count blocks and balance the erase counts of the blocks can be achieved.

Figure 3C:
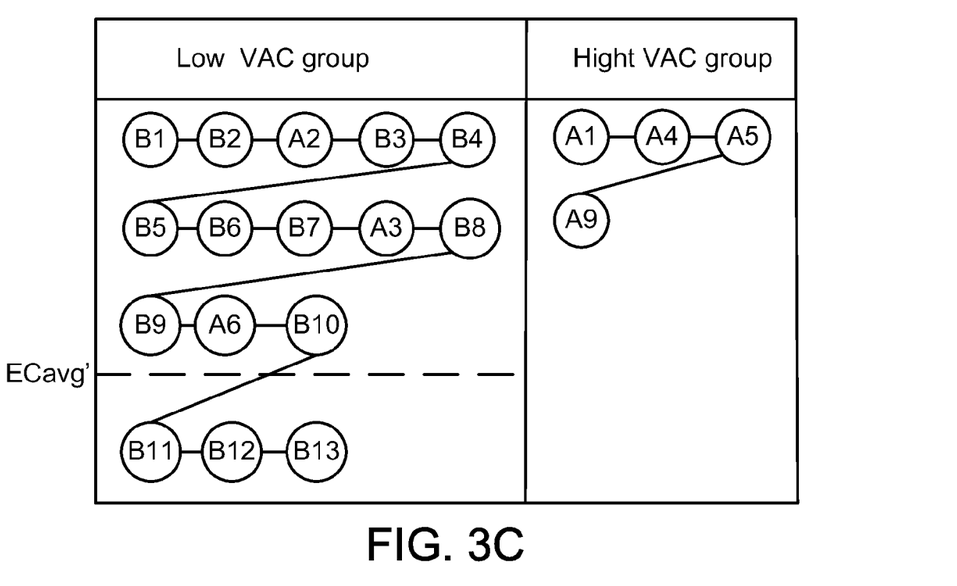

Please refer to FIG. 3C. After the three lowest erase-count blocks A7, B14 and A8 are released, the average erase count of the low VAC group is updated as ECavg'. The updated average erase count ECavg' is the average of the erase counts of the last M blocks in the link of the low VAC group. If M=5, the average erase count ECavg is the average of the erase counts of the last five blocks A6 and B10~B13.

Obviously, the updated average erase count ECavg' is higher than the original average erase count ECavg. That is, after each garbage collection is performed by the solid state drive 10, the average erase count gradually increases. Moreover, the block grouping method of the present invention may be used to determine whether a wear leveling operation should be performed and search the blocks to be subject to the wear leveling operation.

For example, if the data in the block A9 of the high VAC group are cold data, the data in the block A9 are seldom refreshed, and the block A9 is seldom erased and written. In other words, the block A9 has a higher valid data count and a lower erase count. Consequently, after many times of accessing operations, the block A9 is still in the high VAC group and located at the last block of the link (see FIGS. 3A~3C). Since the average erase count of the low VAC group gradually increases, the average erase count of the low VAC group may be compared with an erase count EC_a9 of the block A9 in the high VAC group. In case that the difference between the updated average erase count ECavg' and the erase count EC_a9 of the block A9 exceeds a threshold value, the controlling unit 101 may perform the wear leveling operation on the block A9. That is, the data in the block A9 are transferred to a high erase-count free block A10. Afterwards, the block A9 is erased, and thus the storing space of the block A9 is released.

Figure 3D:
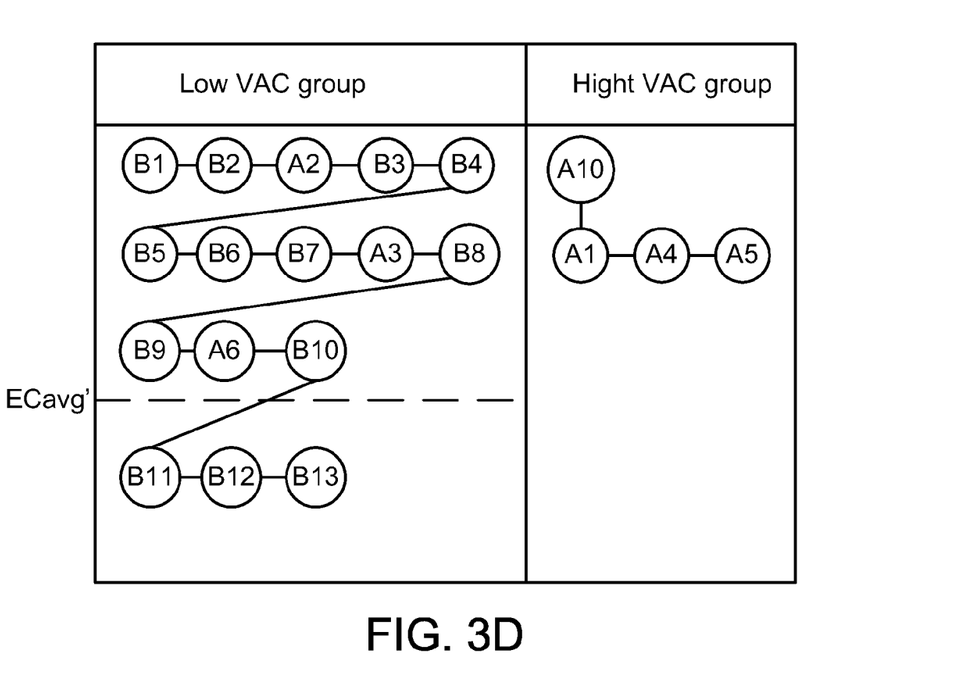

Please refer to FIG. 3D. Since the block A10 has the higher erase count, the block A10 is located at the preceding side of the link of the high VAC group after the data in the block A9 are transferred to block A10. In addition, the block A9 is erased as a new free block, and a free space is released for allowing the controlling unit 101 to store data again.

Moreover, in this embodiment, the controlling unit 101 may judge whether the data in all blocks are cold data according to the history parameters of the respective blocks. The history parameter is a time record that records the time points when the data are written into respective blocks. Generally, the time points of writing the cold data are earlier than the time points of writing the hot data. By judging whether the data in the blocks are cold data or hot data according to the history parameters, the blocks containing the hot data will not be subject to the wear leveling operation. In the above embodiment, after the low erase-count block A9 is released and new data are written into the block A9 again, the block A9 may be located at the last block of the high VAC group. Meanwhile, although the difference between the updated average erase count ECavg' and the erase count EC_a9 of the block A9 exceeds the threshold value, the controlling unit 101 may judges that the data in the block A9 are hot data according to the history parameter. Under this circumstance, the block A9 is not subject to the wear leveling operation.

From the above discussions about the block grouping method of the present invention, the low erase-count block is erased after the garbage collection is performed, so that the erase counts of all blocks of the low VAC group are closer to each other. Moreover, if the difference between the updated average erase count ECavg' of the low VAC group and the erase count of specified blocks of the high VAC group exceeds the threshold value, the specified blocks are subject to the wear leveling operations, so that the erase counts of the high VAC group and the erase counts of the low VAC group are closer to each other. According to an embodiment, the above mentioned specified blocks of the high VAC group contain cold data and have lower erase count. In other words, the history parameters of the above mentioned specified blocks are earlier than the history parameters of other blocks of the high VAC group, and the erase counts of the above mentioned specified blocks are smaller than the erase counts of other blocks of the high VAC group.

Figure 4:
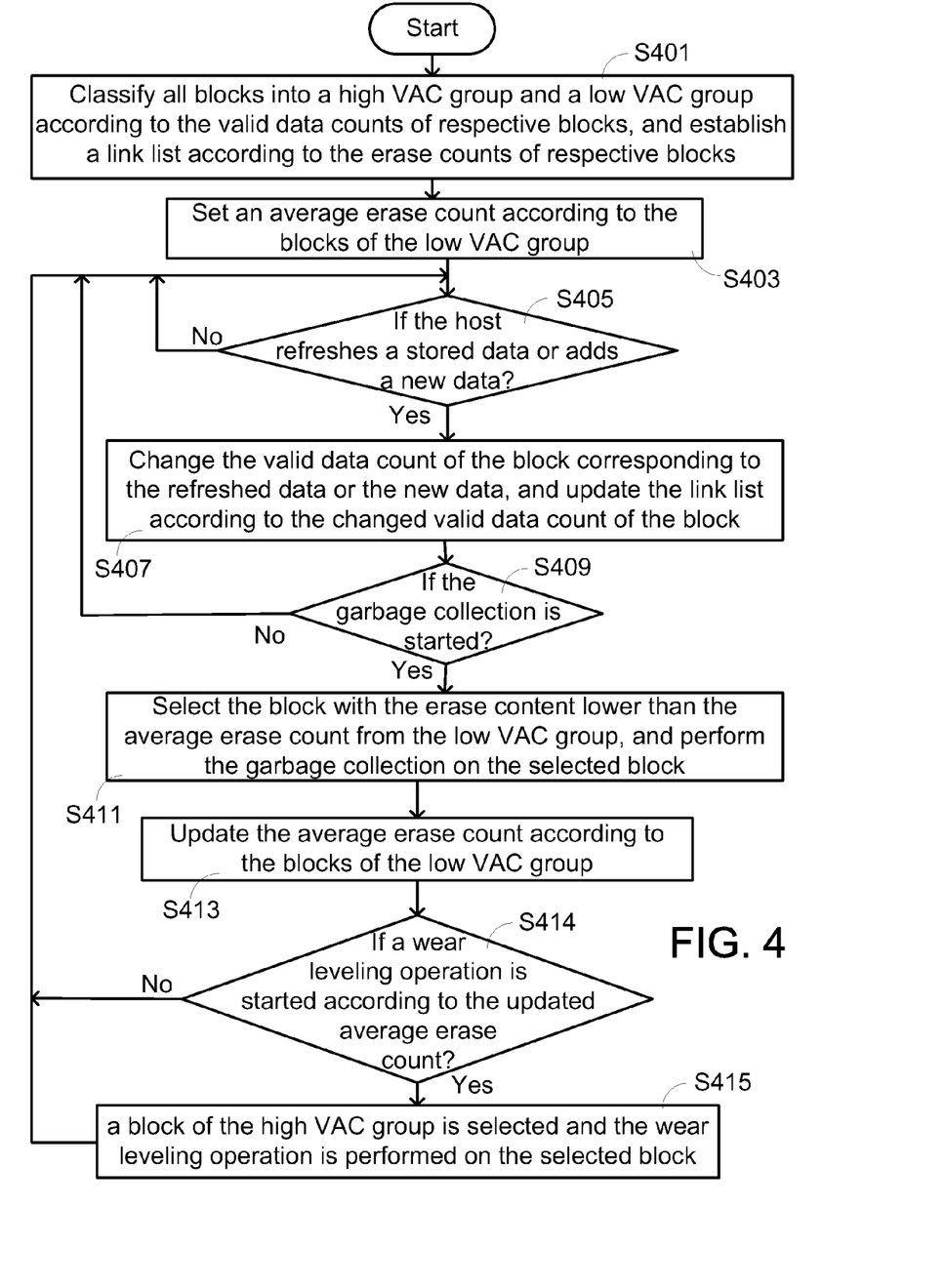
FIG. 4 is a flowchart illustrating a block grouping method for a solid state drive according to an embodiment of the present invention.

FIG. 4 is a flowchart illustrating a block grouping method for a solid state drive according to an embodiment of the present invention.

During the initialization procedure of the solid state drive 10, all blocks of the flash memory 105 are searched, the blocks are classified into a high VAC group and a low VAC group according to the valid data counts of respective blocks, and a link list is established according to the erase counts of respective blocks (Step S401).

Then, an average erase count is set according to the blocks of the low VAC group (Step S402).

In case that the solid state drive 10 can be normally accessed by the host 12, the step S405 is performed to judge whether the host 12 refreshes a stored data of a flash memory 105 or adds a new data into the flash memory 105. If the host 12 does not refresh the stored data or add the new data, the step S405 is repeatedly done. On the other hand, if the host 12 refreshes the stored data or adds the new data, the valid data count of the block corresponding to the refreshed data or the new data is changed, and the link list is updated according to the changed valid data count of the block (Step 407).

Then, the step S409 is performed to judge whether the garbage collection is started by the solid state drive 10. If the garbage collection is not started, the step S405 is repeatedly done. On the other hand, if the garbage collection is started by the solid state drive 10, the block with the erase content lower than the average erase count is selected from the low VAC group, and the garbage collection is performed on the selected block (Step S411). Then, the average erase count is updated according to the blocks of the low VAC group (Step S413).

Then, the step S414 is performed to judge whether a wear leveling operation is started by the solid state drive 10 according to the updated average erase count. If the judging condition of the step S414 is not satisfied, the step S405 is repeatedly done. On the other hand, if the judging condition of the step S414 is satisfied, a block of the high VAC group is selected and the wear leveling operation is performed on the selected block (Step S415). The, the step S405 is repeatedly done.

In the above embodiment, the block grouping method of the present invention is used for classifying the blocks into two groups. Alternatively, in some other embodiments, the block grouping method of the present invention may classify the blocks into plural parts. In addition, the garbage collection and the wear leveling operation are performed by similar procedures.

FIGS. 5A~5D schematically illustrate a block grouping method for classifying blocks into plural parts according to an embodiment of the present invention. The flowchart of FIG. 4 may be applied to the block grouping method of this embodiment.

Figure 5A:
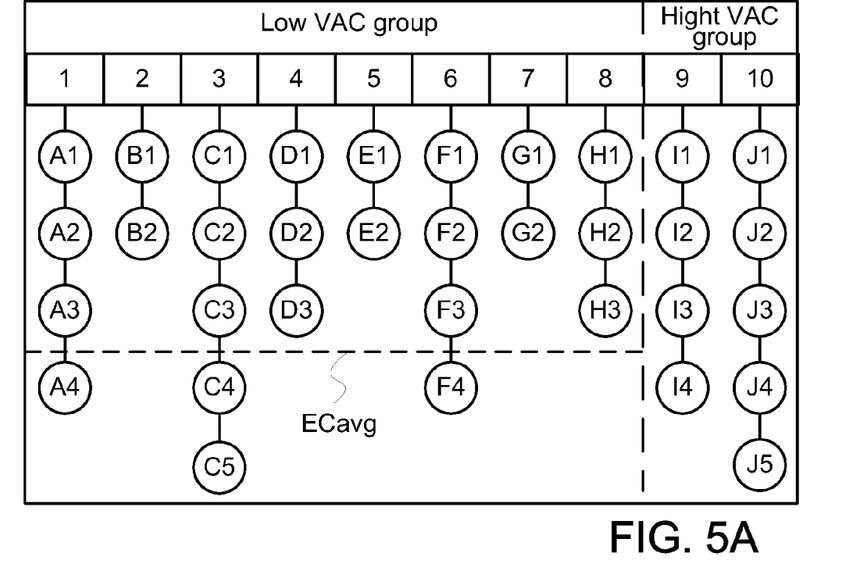
FIGS. 5A~5D schematically illustrate a block grouping method for classifying blocks into plural parts according to an embodiment of the present invention.

During the initialization procedure of the solid state drive 10, all blocks are classified into ten parts according to the valid data counts (VAC) of respective blocks. For example, the blocks with the valid data counts from 1 to 100 are clas-
sified into a first part (1). The blocks with the valid data counts from 101 to 200 are classified into a second part (2). The blocks with the valid data counts from 201 to 300 are classified into a third part (3). The rest may be deduced by analogy. Moreover, the blocks with the valid data counts higher than 901 are classified into a tenth part (10).

After the group classification, as shown in FIG. 5A, the first part (1) comprises four blocks A1~A4; the second part (2) comprises two blocks B1~B2; the third part (3) comprises five blocks C1~C5; the fourth part (4) comprises three blocks D1~D3; the fifth part (5) comprises two blocks E1-E2; the sixth part (6) comprises four blocks F1~F4; the seventh part (7) comprises two blocks G1~G2; the eighth part (8) comprises three blocks H1~H3; the ninth part (9) comprises four blocks I1~I4; and the tenth part (10) comprises five blocks J1~J5. Moreover, the blocks of each group may be arranged in a link according to the erase counts of respective blocks. For example, the first block of each link has the highest erase count, and the last block of each link has the lowest erase count. For example, in the tenth part (10), the block J1 has the highest erase count, and the block J5 has the lowest erase count.

Next, the ten parts are classified into two groups. For example, as shown in FIG. 5A, the blocks from the first part (1) to the eighth part (8) are classified into a low VAC group, and the blocks from the ninth group (9) to the tenth group (10) are classified into a high VAC group. In this embodiment, an average erase count ECavg is set in the low VAC group. In particular, the average erase count ECavg is determined according to some blocks of the low VAC group. For example, in an embodiment, the average erase count ECavg is an average of the erase counts of the M lowest erase-count blocks of the low VAC group. If M=7, the average erase count ECavg is the average of the erase counts of the seven lowest erase-count blocks (e.g. A4, C3~C5, D3 and F3~F4). As shown in FIG. 5A, the erase counts of the blocks A4, C4, C5 and F4 are lower than the average erase count ECavg.

After the link list of the solid state drive 10 is established by the controlling unit 101 and stored in the temporary storage unit 103, the data in the flash memory can be normally accessed by the host 12 and the link list can be updated.

Figure 5B:
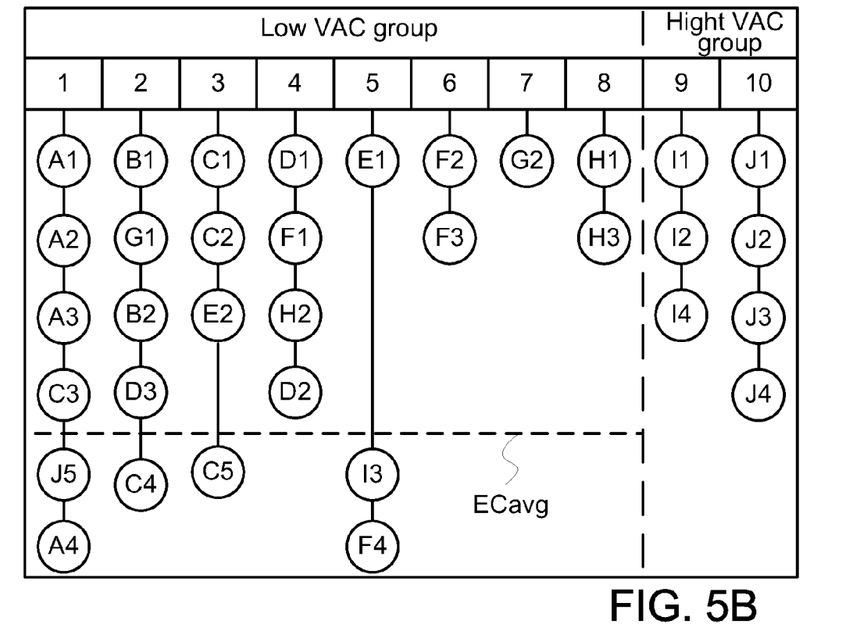

For example, after many times of accessing operations, the contents of the link list in the temporary storage unit 103 is shown in FIG. 5B. When the solid state drive 10 is ready to perform the garbage collection, the blocks with the lower erase counts in the low VAC group are directly selected by the controlling unit 101 in order to be subject to the garbage collection. For example, the six blocks J5, A4, C4, C5, I3 and F4 with the erase counts lower than the average erase count ECavg may be selected to be subject to the garbage collection. After the garbage collection is completed, the six lowest erase-count blocks J5, A4, C4, C5, I3 and F4 are erased as free blocks, and free spaces are released for allowing the controlling unit 101 to store data again.

Obviously, according to the block grouping method of the present invention, after the garbage collection is performed by the solid state drive 10, the blocks with low erase counts are released, and the blocks with low erase counts can be erased and written again. Consequently, while the garbage collection is performed by the solid state drive 10, the efficacy of using the wear leveling operation to release the low erase-count blocks and balance the erase counts of the blocks can be achieved.

Figure 5C:
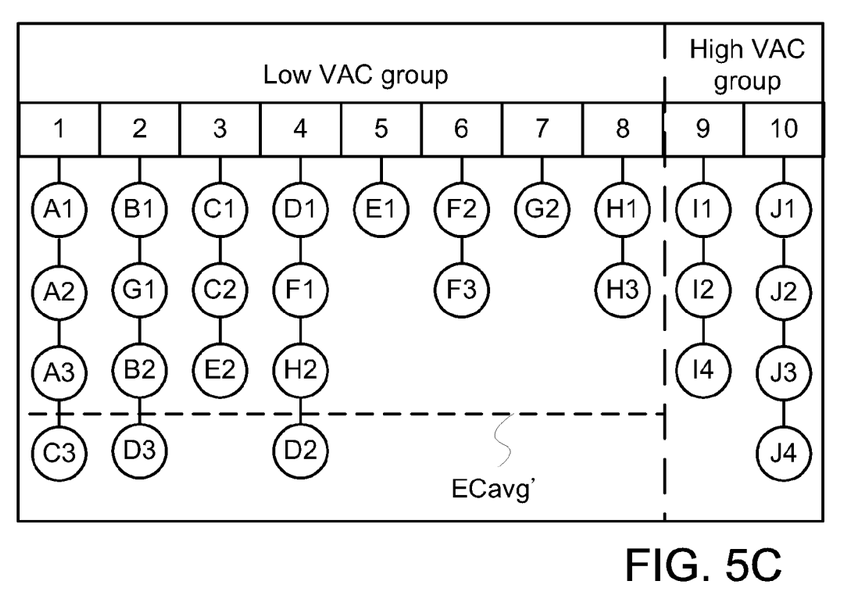

Please refer to FIG. 5C. After the six lower erase-count blocks J5, A4, C4, C5, I3 and F4 are released, the average erase count of the low VAC group is updated as ECavg'. The updated average erase count ECavg' is the average of the erase counts of the last M blocks in the link of the low VAC group. If M=7, the average erase count ECavg is the average of the erase counts of the last seven blocks A3, C3, D3, B2, E2, D2 and H2.

Obviously, the updated average erase count ECavg' is higher than the original average erase count ECavg. That is, after each garbage collection is performed by the solid state drive 10, the average erase count gradually increases. Moreover, the block grouping method of the present invention may be used to determine whether a wear leveling operation should be performed and search the blocks to be subject to the wear leveling operation.

For example, if the data in the blocks J4 and I4 of the high VAC group are cold data, it means that the data in the blocks J4 and I4 are seldom refreshed and the blocks J4 and I4 are seldom erased and written. In other words, the blocks J4 and I4 have higher valid data counts and lower erase counts. Consequently, after many times of accessing operations, the blocks J4 and I4 are still in the high VAC group and located at the last blocks of the link (see FIGS. 5A~5C). Since the average erase count of the low VAC group gradually increases, the average erase count of the low VAC group may be compared with an erase count EC_j4 of the block J4 and an erase count EC_i4 of the block I4 in the high VAC group. In case that the difference between the updated average erase count ECavg' and the erase count EC_j4 of the block J4 and the difference between the updated average erase count ECavg' and the erase count EC_i4 of the block I4 both exceed a threshold value, the controlling unit 101 may perform the wear leveling operation on the blocks J4 and I4. That is, the data in the block J4 are transferred to be stored in a high erase-count free block J6, and the data in the block I4 are transferred to be stored in a high erase-count free block I5. Afterwards, the blocks J4 and I4 are erased, and thus the storing spaces of the blocks J4 and I4 are released.

Figure 5D:
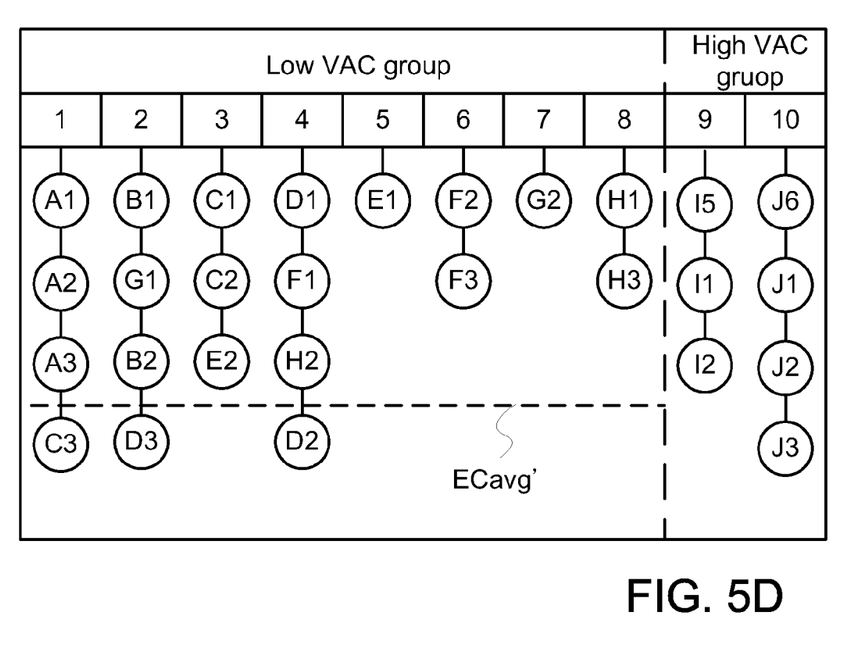

Please refer to FIG. 5D. Since the block J6 has the higher erase count, the block J6 is located at the preceding side of the link of the tenth part (10) after the data in the block J4 are transferred to block J6. Moreover, since the block I5 has the higher erase count, the block I5 is located at the preceding side of the link of the ninth part (9) after the data in the block I4 are transferred to block I5. In addition, the blocks J4 and I4 are erased as new free blocks, and free spaces are released for allowing the controlling unit 101 to store data again.

From the above discussions about the block grouping method of the present invention, the low erase-count block is erased after the garbage collection is performed, so that the erase counts of all blocks of the low VAC group are closer to each other. Moreover, if the difference between the updated average erase count ECavg' of the low VAC group and the erase count of specified blocks of the high VAC group exceeds the threshold value, the specified blocks are subject to the wear leveling operations, so that the erase counts of the high VAC group and the erase counts of the low VAC group are closer to each other. According to an embodiment, the above mentioned specified blocks of the high VAC group contain cold data and have lower erase count. In other words, the history parameters of the above mentioned specified blocks are earlier than the history parameters of other blocks of the high VAC group, and the erase counts of the above mentioned specified blocks are smaller than the erase counts of other blocks of the high VAC group.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures

What is claimed is:

1. A block grouping method for a solid state drive, the block grouping method comprising steps of:
    (a) classifying plural blocks into a high valid data count group and a low valid data count group according to valid data counts of respective blocks, and establishing a link list according to erase counts of respective blocks;
    (b) setting an average erase count according to the blocks of the low valid data count group;
    (c) judging whether a host refreshes a stored data of a flash memory of the solid state drive or adds a new data into the flash memory, wherein if the judging condition is satisfied, changing the valid data count of the block corresponding to the refreshed data or the new data;
    (d) if a garbage collection is not started by the solid state drive, repeatedly performing the step (c); and
    (e) if the garbage collection is started by the solid state drive, selecting the block with an erase content lower than the average erase count from the low valid data count group, performing the garbage collection on the selected block, updating the average erase count according to the blocks of the low valid data count group, and determining whether a wear leveling operation is started according to the updated average erase count.

2. The block grouping method as claimed in claim 1, wherein the step of establishing the link list comprises sub-steps of:
    establishing a first link between the blocks of the low valid data count group according to a sequence of the erase counts of the corresponding blocks; and
    establishing a second link between the blocks of the high valid data count group according to a sequence of the erase counts of the corresponding blocks.

3. The block grouping method as claimed in claim 1, where the step (b) further comprises steps of:
    selecting M blocks with lower erase counts from the low valid data count; and
    setting an average of the erase counts of the M blocks as the average erase count.

4. The block grouping method as claimed in claim 1, where the step (e) further comprises steps of:
    selecting a first block from the high valid data count;
    calculating a difference between the average erase count and a first erase count of the first block; and
    if the difference exceeds a threshold value, performing the wear leveling operation on the first block.

5. The block grouping method as claimed in claim 1, where the step (a) further comprises steps of:
    classifying the plural blocks into plural parts according to the valid data counts of respective blocks;
    classifying plural parts into the high valid data count group and the low valid data count group; and
    establishing the link list according to the erase counts of respective blocks.

6. The block grouping method as claimed in claim 5, wherein the step of establishing the link list comprises a sub-step of establishing a link between the blocks of each part according to a sequence of the erase counts of the corresponding blocks.

7. A block grouping method for a solid state drive, the block grouping method comprising steps of:

classifying plural blocks into a high valid data count group and a low valid data count group according to valid data counts of respective blocks;

setting an average erase count according to a specified number of blocks of the low valid data count group;

selecting a first block from the high valid data count;

calculating a difference between the average erase count and a first erase count of the first block; and if the difference exceeds a threshold value, performing a wear leveling operation on the first block.

8. The block grouping method as claimed in claim 7, wherein the step of setting the average erase count according to the specified number of blocks of the low valid data count group further comprises steps of:

selecting M blocks with lower erase counts from the low valid data count; and setting an average of the erase counts of the M blocks as the average erase count.

9. The block grouping method as claimed in claim 7, further comprising a step of selectively performing a garbage collection, wherein if the garbage collection is started by the solid state drive, selecting the block with an erase content lower than the average erase count from the low valid data count group, and updating the average erase count.

10. A block grouping method for a solid state drive, the block grouping method comprising steps of:

classifying plural blocks into a high valid data count group and a low valid data count group according to valid data counts of respective blocks, and establishing a link list according to erase counts of respective blocks; and setting an average erase count according to a specified number of blocks of the low valid data count group;

wherein, if a garbage collection is started by the solid state drive, the block with a lower erase content is selected from the low valid data count group according to the link list, and the garbage collection is performed on the selected block;

wherein, if a difference between the average erase count and a first erase count of a specified block of the high valid data count group exceeds a threshold value, a wear leveling operation is performed on the first block.

11. The block grouping method as claimed in claim 10, wherein the step of setting the average erase count according to the specified number of blocks of the low valid data count group further comprises steps of:

selecting M blocks with lower erase counts from the low valid data count; and setting an average of the erase counts of the M blocks as the average erase count.

12. The block grouping method as claimed in claim 10, wherein the specified block of the high valid data count group contains cold data, and the first erase count of the specified block is lower in the high valid data count group.

13. The block grouping method as claimed in claim 10, wherein a history parameter of the specified block of the high valid data count group is earlier in the high valid data count group, and the first erase count of the specified block is lower in the high valid data count group.

* * * * *